United States Patent
Lee et al.

(10) Patent No.: US 10,872,468 B2
(45) Date of Patent: Dec. 22, 2020

(54) METHOD AND APPARATUS FOR INTERFACING SKINNING WEIGHT OF 3D MODEL SURFACE FOR RIGGING OF 3D MODEL

(71) Applicant: Korea Advanced Institute of Science and Technology, Daejeon (KR)

(72) Inventors: Sung-Hee Lee, Daejeon (KR); Seungbae Bang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/266,836

(22) Filed: Feb. 4, 2019

(65) Prior Publication Data
US 2020/0126296 A1    Apr. 23, 2020

(30) Foreign Application Priority Data
Oct. 22, 2018    (KR) .................. 10-2018-0125912

(51) Int. Cl.
G06T 17/20    (2006.01)
G06T 13/40    (2011.01)

(52) U.S. Cl.
CPC .............. *G06T 17/20* (2013.01); *G06T 13/40* (2013.01)

(58) Field of Classification Search
None
See application file for complete search history.

(56) References Cited

U.S. PATENT DOCUMENTS

| | | | |
|---|---|---|---|
| 2010/0149179 A1* | 6/2010 | de Aguiar | G06T 9/00 345/420 |
| 2012/0019517 A1 | 1/2012 | Corazza et al. | |
| 2013/0127853 A1* | 5/2013 | Corazza | G06T 15/08 345/420 |
| 2017/0032055 A1* | 2/2017 | Eisemann | G06T 19/20 |

FOREIGN PATENT DOCUMENTS

JP    2006-523891 A    10/2006

OTHER PUBLICATIONS

Vaillant et al. ( "Robust Iso-Surface Tracking for Interactive Character Skinning", ACM Trans. Graph. 33, 6, Article 189 (Nov. 2014)). (Year: 2014).*

Ohy et al., "Deformation Styles for Spline-based Skeletal Animation," Eurographics/ ACM SIGGRAPH Symposium on Computer Animation (2007) (Year: 2007).*

"KAIST develops technology to reduce 'character rigging' workload with algorithms", http://www.etnews.com/20180926000031?m=1#, Sep. 26, 2018.

Vaillant, Rodolphe, et al. "Robust iso-surface tracking for interactive character skinning." ACM Transactions on Graphics (TOG) 33.6 (2014).

* cited by examiner

*Primary Examiner* — Tapas Mazumder
(74) *Attorney, Agent, or Firm* — Foley & Lardner LLP

(57) ABSTRACT

A method and apparatus for interfacing a skinning weight of a 3D model surface for 3D model rigging is provided. The method includes generating a spline on the 3D model and computing a skinning weight of the 3D model based on the generated spline. The computing of the skinning weight includes calculating the skinning weight of the 3D model by minimizing energy which satisfies a predetermined constraint.

20 Claims, 20 Drawing Sheets

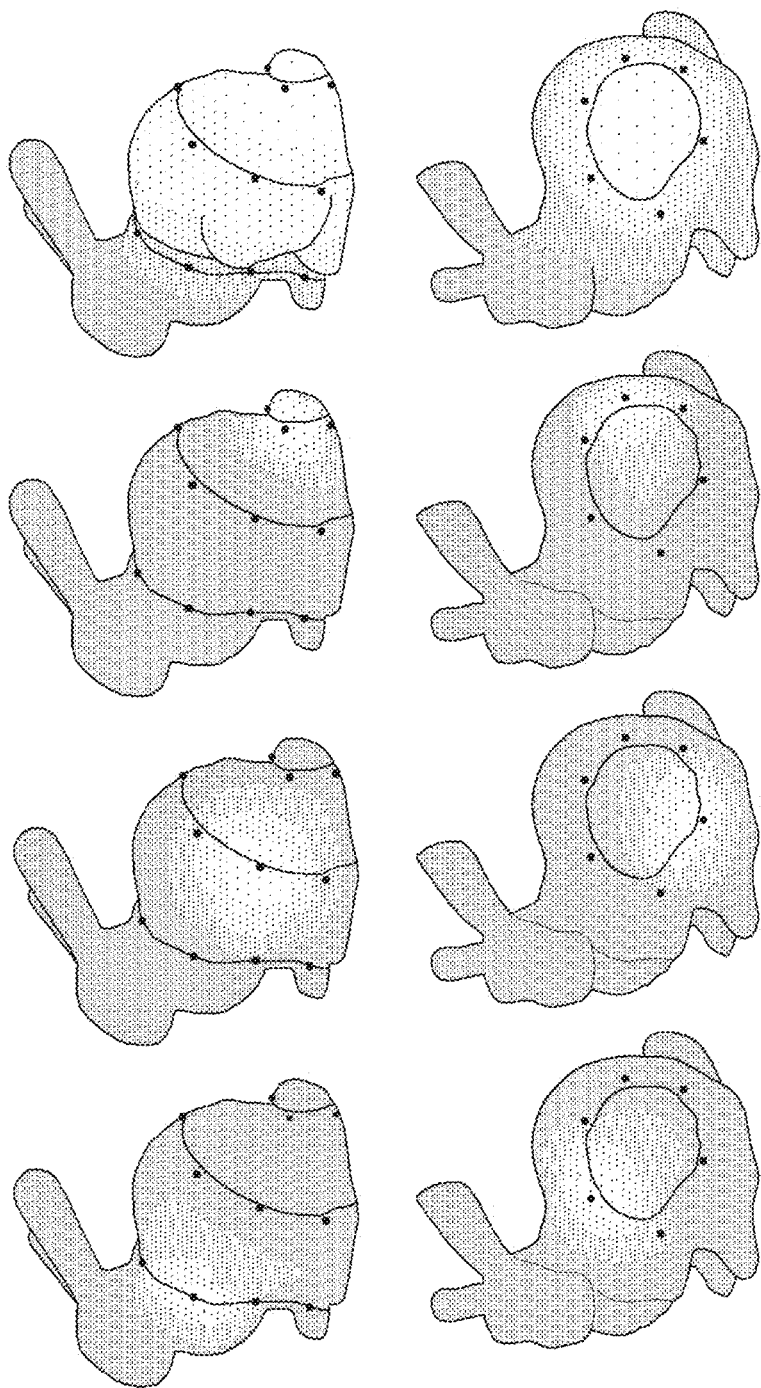

METHOD AND APPARATUS FOR INTERFACING SKINNING WEIGHT OF 3D MODEL SURFACE FOR RIGGING OF 3D MODEL

CROSS-REFERENCE TO RELATED APPLICATIONS

This application claims priority under 35 U.S.C. § 119 to Korean Patent Application No. 10-2018-0125912 filed on Oct. 22, 2018, in the Korean Intellectual Property Office, the disclosures of which are incorporated by reference herein in their entireties.

BACKGROUND

Embodiments of the inventive concept described herein relate to technologies of interfacing a skinning weight of a three-dimensional (3D) model surface, and more particularly, relate to a method and apparatus for interfacing a skinning weight to edit the skinning weight using a spline-based interface of the 3D model surface.

There is the character rigging as an element which is achieved prior to applying the animation to the character. The character rigging is to set how to deform the corresponding character.

The first element of the rigging is to first create the bone, and the second element thereof is to set how to deform the character skin as the bone moves. Herein, to set how to deform the character skin according to the movement of the bone is called the skinning weight.

When each bone deforms, the skinning weight refers to a value which represents a deformation rate in the skin corresponding to the bond as a scalar field bounded from 0 to 1. When the skinning weight is discretely defined, the corresponding deformation is in a form corresponding to it. When the skinning weight is smoothly distributed, the more natural results may be shown.

The deformation of a virtual character uses a model such as Linear Blend Skinning (LBS) or Dual Quatemion Skinning (DQS). This is affected greatly by the quality of the skinning weight which represents the correlation between the bonds and the character skins.

Despite the recent advances in automatic methods for computing skinning weights, manual intervention is still indispensable to produce high quality character deformation. However, current modeling software does not provide efficient tools for the manual definition of skinning weights. That is, there are a few researches in terms of interface which helps users naturally obtain the desired results.

The paint-based interface is the interface for manually editing skinning weights, which is still widely used in the industry, and gives users high degrees of freedom, but needs the skilled technique and at the expense of significant efforts and time.

SUMMARY

Embodiments of the inventive concept provide a method and apparatus for interfacing a skinning weight to edit the skinning weight using a spline-based interface of a 3D model surface.

According to an exemplary embodiment, a method for interfacing a skinning weight may include obtaining an isoline on the 3D model and computing a skinning weight of the 3D model based on the obtained isoline.

The computing of the skinning weight may include computing the skinning weight of the 3D model based on the obtained isoline and a hybrid method in which an interpolation-based method and a diffusion-based method are combined.

The computing of the skinning weight may include computing the skinning weight of the 3D model by minimizing energy which satisfies a predetermined constraint.

The obtaining of the isoline may include, when a skinning weight is specified on a mesh surface of the 3D model, obtaining an isoline for an iso-value of the specified skinning weight.

According to an exemplary embodiment, a method for interfacing a skinning weight may include generating a spline on the 3D model based on a user input using a spline-based interface and computing a skinning weight of the 3D model based on the generated spline.

The generating of the spline may include, when a skinning weight is specified on a mesh surface of the 3D model, obtaining an isoline for an iso-value of the specified skinning weight and generating the spline by using the obtained isoline.

The computing of the skinning weight may include computing the skinning weight of the 3D model by minimizing energy which satisfies a predetermined constraint.

The computing of the skinning weight may include, when there is only one iso-value spline on the 3D model, computing the skinning weight based on a diffusion-based method and, when there is more than one iso-value spline on the 3D model, computing the skinning weight based on a hybrid method in which an interpolation-based method and the diffusion-based method are combined.

The computing of the skinning weight may include dividing a surface region of the 3D model into an interpolation-based region and a diffusion-based region based on a minimum iso-value of the generated spline and computing the skinning weight for the divided interpolation-based region and the skinning weight for the divided diffusion-based region by respectively using an interpolation-based method and a diffusion-based method.

The computing of the skinning weight may include setting a region above a predetermined threshold to a local computation region by using the predetermined threshold and computing the skinning weight for the set local computation region.

The computing of the skinning weight may include computing the skinning weight of the 3D model by controlling a slope of skinning weight distribution on the generated spline.

The computing of the skinning weight may include computing the skinning weight of the 3D model based on an anchor weight for transforming iso-values arranged to anchor points of the generated spline into a skinning weight.

According to an exemplary embodiment, an apparatus for interfacing a skinning weight may include an acquisition unit configured to obtain an isoline on the 3D model and a computation unit configured to compute a skinning weight of the 3D model based on the obtained isoline.

The computation unit may be configured to compute the skinning weight of the 3D model based on the obtained isoline and a hybrid method in which an interpolation-based method and a diffusion-based method are combined.

The computation unit may be configured to compute the skinning weight of the 3D model by minimizing energy which satisfies a predetermined constraint.

The acquisition unit may be configured to, when a skinning weight is specified on a mesh surface of the 3D model, obtain an isoline for an iso-value of the specified skinning weight.

According to an exemplary embodiment, an apparatus for interfacing a skinning weight may include a generation unit configured to generate a spline on the 3D model based on a user input using a spline-based interface and a computation unit configured to compute a skinning weight of the 3D model based on the generated spline.

The generation unit may be configured to, when a skinning weight is specified on a mesh surface of the 3D model, obtain an isoline for an iso-value of the specified skinning weight and generate the spline by using the obtained isoline.

The computation unit may be configured to compute the skinning weight of the 3D model by minimizing energy which satisfies a predetermined constraint.

The computation unit may be configured to, when there is only one iso-value spline on the 3D model, compute the skinning weight based on a diffusion-based method and, when there is more than one iso-value spline on the 3D model, compute the skinning weight based on a hybrid method in which an interpolation-based method and the diffusion-based method are combined.

The computation unit may be configured to divide a surface region of the 3D model into an interpolation-based region and a diffusion-based region based on minimum iso-value of the generated spline and compute the skinning weight for the divided interpolation-based region and the skinning weight for the divided diffusion-based region by respectively using an interpolation-based method and a diffusion-based method.

The computation unit may be configured to set a region above a predetermined threshold to a local computation region by using the predetermined threshold and compute the skinning weight for the set local computation region.

The computation unit may be configured to compute the skinning weight of the 3D model by controlling a slope of skinning weight distribution on the generated spline.

The computation unit may be configured to compute the skinning weight of the 3D model based on an anchor weight for transforming iso-values arranged to anchor points of the generated spline into a skinning weight.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 9 is a drawing illustrating an example of an anchor weight and its applied skinning weight on a bunny model;

DETAILED DESCRIPTION

Figure 1:
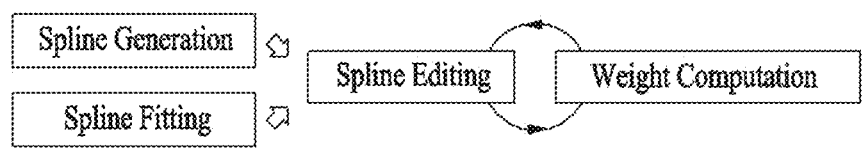
FIG. 1 is a drawing illustrating an overview for describing technology according to an embodiment of the inventive concept.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other components, steps, operations, and/or elements other than stated components, steps, operations, and/or elements but do not exclude presence of additional elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, a description will be given in detail of exemplary embodiments of the inventive concept with reference to the accompanying drawings. Like reference numerals designate like components on the drawings, and a repeated description of the same components will be omitted.

Embodiments of the inventive concept may be the gist of intuitively editing skinning weights and reducing a time taken to perform rigging by providing a spline-based interface in editing the skinning weights which are essential for the rigging.

In other words, embodiments of the inventive concept may provide an interface for editing skinning weights based on splines, which represents the isolines of skinning weights on a mesh of a 3D model. When a user drags a small number of spline anchor points, embodiments of the inventive concept may update the shape of the isolines and may smoothly interpolate or propagate the weights while respecting the given iso-value on the spline.

FIG. 1 is a drawing illustrating an overview for describing technology according to an embodiment of the inventive concept. As shown in FIG. 1, an interface technology for editing skinning weights according to an embodiment of the inventive concept may include generating and fitting splines, editing splines, and computing weights.

In other words, in an embodiment of the inventive concept, a user may generate splines from scratch by using a graphic user interface (GUI) or may extract splines from the given initial skinning weight. As the splines are edited, the skinning weight may be updated to satisfy the spline constraints.

Of course, an embodiment of the inventive concept may perform an interface function for generating bones from a 3D model, for example, a character and editing such skinning weights. Those skilled in the art understands the method for generating bones of the 3D model, so no detailed description thereof will be provided.

Technology according to an embodiment of the inventive concept may provide the following functions.

First, a spline-based interface for defining skinning weights may be presented and the effectiveness of the interface may be shown.

Secondly, techniques that enable the spline-based skinning interface to run in real time may be presented. Methods that efficiently compute skinning weights while respecting user-specified initial weights and an efficient spline fitting algorithm may be provided.

Finally, among several candidate smoothing functions, a particular combination of functions that generates appropriate skinning weight distribution over the surface given splines.

A description will be in detail of an embodiment of the inventive concept with reference to FIGS. 2 to 14.

Spline Model

B-Spline

An embodiment of the inventive concept may use the standard cubic B-spline model. The B-spline curve is widely used in many applications because of its smoothness and local controllability. By moving an anchor point, an embodiment of the inventive concept may selectively modify the B-spline curve without losing its geometric continuity. In Euclidean space, the B-spline curve may be defined as a weighted sum of B-spline basis functions. Given a set of anchor points $C_i^p$, a B-spline curve s(u) may be represented as Equation 1 below.

$$s(u) = \sum_{i=0}^{n-1} c_i^p R_{i,r}(u) \quad \text{[Equation 1]}$$

With Na number of anchor points, basis functions Ri,r(u) may be defined on a knot vector t=$t_0$, $t_1$ . . . , $t_{Na+r-1}$, $t_{Na+r}$.

For a set of sample parameter values U={$u_0$, . . . , $u_{Ns-1}$}, an embodiment of the inventive concept may represent the positions of the corresponding points on the spline $S^p(\in \Re^{Ns \times 3}$) in a matrix form as Equation 2 below.

$$S^p = BC^p \quad \text{[Equation 2]}$$

Herein, $C^p(\in\Re^{Ns \times 3})$ denotes the position of anchor points, and $B(\in\Re^{Ns \times N_a})$ denotes the basis matrix that corresponds to U.

Table 1 below summarizes the symbols used in an embodiment of the inventive concept.

TABLE 1

| | |
|---|---|
| $N_v$ | number of vertices |
| $N_s$ | number of spline points |
| $N_a$ | number of anchor points |
| $N_o$ | number of isoline points |
| $w^s$ | Skinning weight |
| $w^g$ | Gradient weight |
| K | Anchor weight |
| G | Gradient anchor weight |
| $C^p$ | position of anchor points |
| $c^i$ | iso-value of anchor points |
| $c^g$ | gradient coefficient value of anchor points |
| $S^p$ | position of spline points |
| $s^i$ | iso-value of spline points |
| $O^p$ | position of isoline points |
| $o^i$ | iso-value of isoline points |

An embodiment of the inventive concept may use splines as either a closed loop curve or a clamped open curve, and both types may require constraining the knots.

For a closed loop curve, the loop closure may be ensured by duplicating the first three points and adding them as virtual anchor points. However, this trick may break the form of Equation 2 above. An embodiment of the inventive concept may achieve the loop closure by modifying the basis function B by adding the first three columns value to the last three columns. For an open curve, an embodiment of the inventive concept may use the open spline curve to be clamped such that the curve's end points match their first and last anchor points because they give the user a more intuitive control. This may be achieved by defining the knot vector such that the first and last knots are repeated with multiplicity equal to the order r as follows: $u_0 = \ldots = U_{r-1}$, $u_{Na+1} = \ldots = u_{Na+r}$.

Figure 2:
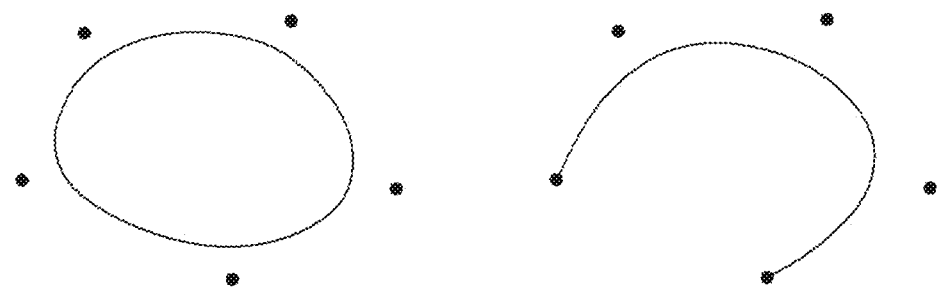
FIG. 2 is a drawing illustrating an example of splines generated with closed and open conditions.

In both case, only the change in the basis matrix B in Equation 2 above may be controlled. With the anchor points being fixed, the topology of the spline may be easily changed by replacing the basis matrix. FIG. 2 shows an example of splines generated with closed and open conditions, the splines being generated with the same anchor points.

Spline on Surface

Spline curves for controlling the skinning weights must be defined on a surface domain. To this end, an embodiment of the inventive concept may use the weighted average on the surface, and the corresponding technique facilitates fast computation by approximating the geodesic metric by using a Euclidean embedding metric.

The Euclidean-embedding metric may be defined by an embedding e:M→$\Re^D$ where M is a metric space and D is set to 8. The distance between two points on the surface may be computed as the Euclidean distance between their embeddings $d(x_1, x_2)=\|e(x_1)-e(x_2)\|$. By using the Frechet mean with anchors $x_i$ and weights $\xi_i$, the weighted average may be defined as Equation 3 below.

$$\hat{x} = \underset{x \in M}{\operatorname{argmin}} \sum_i \xi_i d(x, x_i)^2 \quad \text{[Equation 3]}$$

Using Equation 3 above, defining a spline curve on the surface as a function of a parameter u∈[0, 1] may be represented as Equation 4 below.

$$\hat{x}(u) = \underset{x \in M}{\operatorname{argmin}} \sum_{i=0}^{N_a-1} B_i(u) d(x, c_i^p)^2 \quad \text{[Equation 4]}$$

After solving Equation 4 above, the original method may use the Phong projection technique to project $\hat{x}$ to the surface. To accelerate this process, a local search method may be used that combines a greedy search for the locally nearest vertex and a breadth-first search for a target triangle to which $\hat{x}$ is projected. An embodiment of the inventive concept may first find a Phong projection with a global search for the first spline generation. Subsequently, when an existing spline is edited, an embodiment of the inventive concept may examine the faces that have the current isoline as well as their adjacent faces to find the closest face for the Phong projection.

For sampling spline points, an embodiment of the inventive concept may visualize the spline as connected line segments made by sample points $S_p = \{s_0, s_1, \ldots, s_{Ns-1}\}$ of the spline, where $s_k^P = x(u_k)$ is a sample point for a parameter value of $u_k$. In order to obtain more or less uniformly sampled points on the spline, the number of sampling parameters $u_k$ between two anchor points $c_k^P$ and $c_{k+1}^P$ may be set to be proportional to $d(c_k^P, c_{k+1}^P)$. An embodiment of the inventive concept may use these spline points to set constraints on weight computation.

Weight Computation

Given the spline constraint to which iso-values are assigned, skinning weight computation may be to compute a scalar field that interpolates or approximates the spline constraint. An embodiment of the inventive concept must satisfy the spline constraint, and, because the spline exists on a surface domain, each spline point may be located in a specific triangle on the mesh. In this case, the position in the triangle may be computed using barycentric coordinates. A description will be given in detail of the weight computation.

Given a set of splines, an embodiment of the inventive concept may compute a smooth scalar field that interpolates or approximates the spline constraint. In this case, an embodiment of the inventive concept may use two methods such as an interpolation-based method and a diffusion-based method to compute skinning weights.

Figure 3:
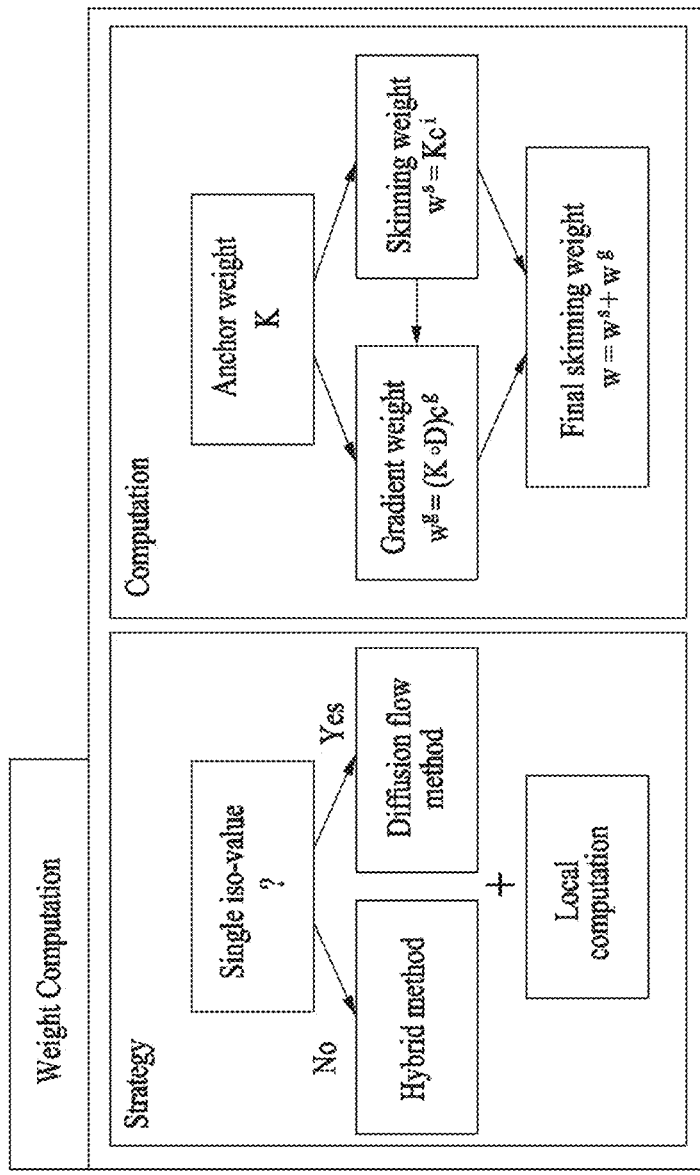
FIG. 3 is a drawing illustrating an overall framework of computing a skinning weight.

FIG. 3 is a drawing illustrating an overall framework of computing a skinning weight. As shown in FIG. 3, when one iso-value spline is specified, the skinning weight may be computed by the diffusion-based method. On the other hand, if there is more than one iso-value spline, the hybrid of both methods may be used to compute the skinning weight. An embodiment of the inventive concept may also use local computation that reduces the region of non-zero weight and accelerates the computation. Furthermore, an embodiment of the inventive concept may use a method to decompose the influence of the anchor weight assigned from a vertex skinning weight to anchor points for faster weight editing. For a more sophisticated control of weight, the gradient control technique may be employed to add the gradient weight to the skinning weight. The final weight may be computed as the sum of skinning weights of the gradient weight.

Spline Constraint

The skinning weights of the vertices in an embodiment of the inventive concept must satisfy the spline constraint to be determined to agree with the given skinning weight of the spline. An embodiment of the inventive concept may use barycentric coordinates to interpolate the vertex skinning weights for each mesh face. That is, the weight $w(s_k^P)$ of a spline point $s_k^P$ may be expressed as Equation 5 below.

$$w(s_k^P) = b_{k_0} w_{k_0} + b_{k_1} w_{k_1} + b_{k_2} w_{k_2} = s_k^i \quad \text{[Equation 5]}$$

Herein, $w_{kj}$ denotes the weight of a vertex $k_j$ of a face to which the spline point $s_k^P$ belongs, and $b_{kj}$ denotes the barycentric coordinates of $s_k^P$ with respect to the vertex.

Therefore, the vertex weights $w_{kj}$ must be determined to satisfy $w(s_k^P)$. Stacking Equation 5 above for a set of desired weights of spline points into a matrix may constitute a linear equality constraint equation and may be represented as Equation 6 below.

$$Ax = s^i, \text{ where } s^i = Bc^i \quad \text{[Equation 6]}$$

Herein, the matrix $A(\in \mathfrak{R}^{N_s \times N_v})$ denotes a matrix with $A_{k,kj} = b_{kj}$ that stacks the barycentric conditions Equation 5 in each row, x denotes the skinning weights of all vertices, and $s^i$, $c^i$ denotes a vector of the iso-value of the spline points and anchor points, respectively.

The skinning weight $w^s$ may be computed by minimizing the energy $E(x)$ that satisfies the constraints of the linear equality equation and may be represented as Equation 7 below.

$$w^s = \mathrm{argmin}_x E(x) \text{ subject to } Ax = s^i \quad \text{[Equation 7]}$$

The decision of energy function $E(x)$ may determine the overall shape of the skinning weight. A description will be given of two types of methods that satisfy the spline constraint, that is, the interpolation-based method and diffusion flow method.

Interpolation-Based Method

The technique of interpolating the scalar field on a surface given point constraints has been introduced for generalized barycentric coordinates and is well known in the existing researches. For the specific application for the skinning weight of articulated characters, methods based on harmonic functions and bi-harmonic functions have been developed. An embodiment of the inventive concept may formulate a problem within a surface with the linear equality constraint of spline. Specifically, an embodiment of the inventive concept may minimize the quadratic energy under the spline constraint and may represent the quadratic energy as Equation 8 below.

$$w^s = \mathrm{argmin}_x x^T Q x \text{ subject to } Ax = s^i \quad \text{[Equation 8]}$$

Herein. $Q(\in \mathfrak{R}^{N_v \times N_v})$ denotes a positive semi-definite matrix of quadratic coefficients.

An embodiment of the inventive concept may solve this equation by using Lagrange multipliers with a hard constraint problem such as $$\begin{pmatrix} Q & A^T \\ A & 0 \end{pmatrix} \begin{pmatrix} x \\ \Lambda \end{pmatrix} = \begin{pmatrix} 0 \\ s^i \end{pmatrix}.$$

However, with this hard constraint, the positive semi-definiteness may be broken, and thus a fast Cholesky solver may not be used. Alternatively, an embodiment of the inventive concept may enforce the linear equality constraint weakly by appending a quadratic penalty term to the original energy. This may result in a new quadratic energy like Equation 9 below.

$$E(x) = \alpha x^T Q x + (Ax - s^i)^T U(Ax - s^i) \quad \text{[Equation 9]}$$

Herein, the scalar coefficient α may control the importance between the two terms and the matrix $U(\in \mathfrak{R}^{N_s \times N_s})$ may determine the weights among the linear equality constraints.

An embodiment of the inventive concept may set U to the identity matrix to give equal weights to every spline constraint. The minimization ws of the energy may be obtained from $$\frac{dE(x)}{dx} = 0$$

and may be represented as Equation 10 below.

$$(\alpha Q + A^T A) w^s = A^T s^i \quad \text{[Equation 10]}$$

Herein, by setting the scalar coefficient α to a proper value, Equation 10 above may generate results similar to the solution with the hard constraint.

Describing the choice of an operator, an embodiment of the inventive concept may review the choice of energy for the interpolation-based method. An embodiment of the inventive concept may first consider a common energy in computer graphics. The Dirichlet energy, which is a quadratic function that measures how much a function x changes over domain, may be represented as $E(x) = -x^T L_s x$, where Ls is a symmetric matrix constraining the edge weights. The corresponding Euler-Lagrange equation may be the Laplace equation and may be represented as $L_s x = 0$. Another popular choice may be the squared Laplacian energy, which measures the magnitude of curvature, and may be represented as $E(x) = -x^T L_s M^{-1} L_s x$, where M is a diagonal mass matrix. The corresponding Euler-Lagrange equation may be the bi-Laplace equation and may be $L_s M^{-1} L_s x = 0$. Thus, an embodiment of the inventive concept may choose the matrix Q with the Laplacian operator $Q = -L_s$ and the bi-Laplacian operator $Q = L_s M^{-1} L_s$.

Figure 4:
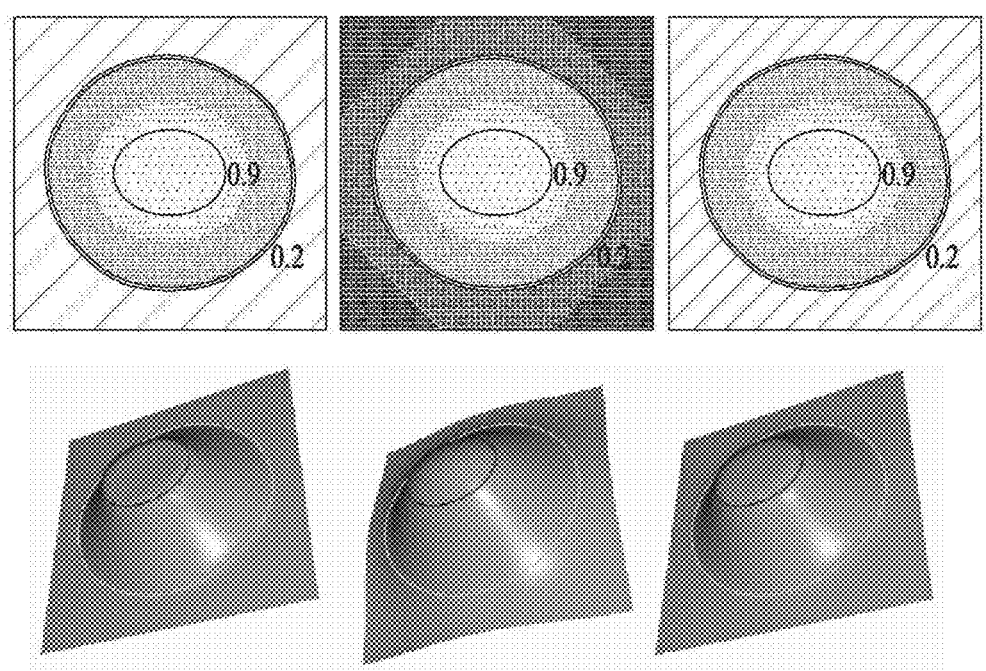
FIG. 4 is a drawing illustrating different skinning weight distributions solved with Laplacian and bi-Laplacian operators when two splines of iso-values are given.

FIG. 4 is a drawing illustrating different skinning weight distributions solved with Laplacian and bi-Laplacian operators when two splines of iso-values are given. FIG. 4 sequentially illustrates distributions of skinning weights for a Laplacian operator, a bi-Laplacian operator, and the sum of the Laplacian and bi-Laplacian operators, with two iso-values of [0.2, 0.9].

As shown in FIG. 4, the in-between regions of two splines show a similar skinning weight distribution while the bi-Laplacian results in a slightly smoother result. Differences are notable on the boundaries of the splines, and this is because the bi-Laplacian creates a much smoother result and is also capable of extrapolation. With this observation, it may seem that the bi-Laplacian is a natural choice to be the operator. However, the extrapolating nature of the bi-Laplacian may often generate unintuitive results.

Figure 5:
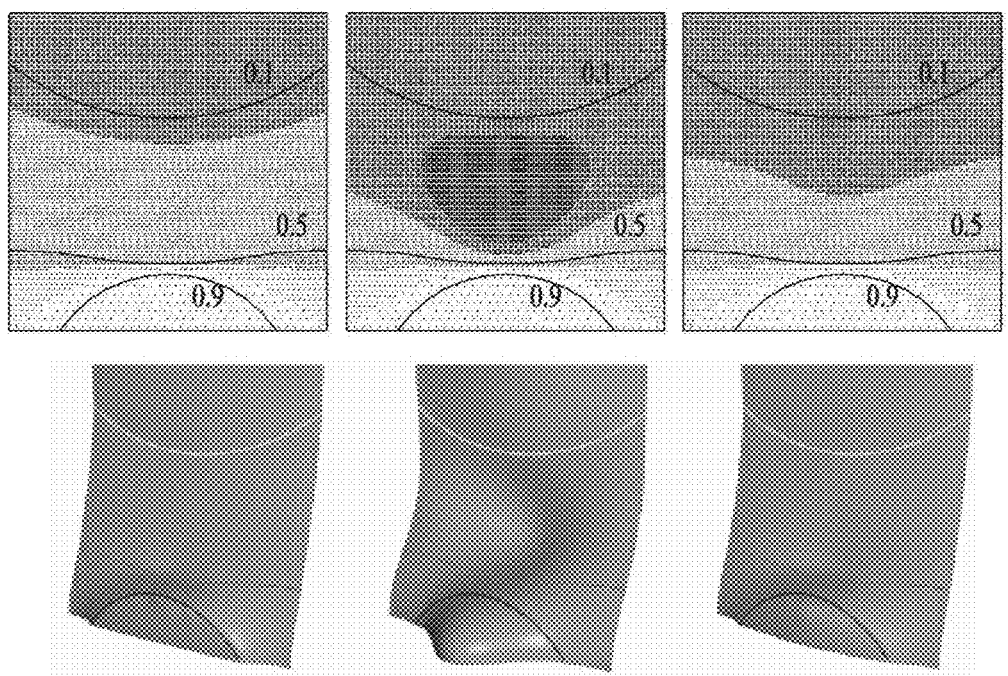
FIG. 5 is a drawing illustrating an example of a skinning weight generated using an interpolation-based method.

FIG. 5 is a drawing illustrating an example of a skinning weight generated using an interpolation-based method. FIG. 5 illustrates skinning weights for a Laplacian operator, a bi-Laplacian operator, and the sum of the Laplacian and bi-Laplacian operators, with iso-values of [0.1, 0.5, 0.9].

As shown in FIG. 5, as may be observed through the skinning weights with three splines of iso-values, the steep decrease of weights from 0.9 to 0.5 makes the bi-Laplacian operator create a deep downfall below 0.1 in the region [0.1, 0.5], which is counter-intuitive for the skinning weights as one would expect the weight distribution in that region to be between 0.1 and 0.5. This is due to the nature of the C1-continuity of the bi-Laplacian, which propagates the slopes outside the boundaries. For a region bounded by two iso-value splines, it is more intuitive to have the skinning weights interpolating between the two iso-values, which is achieved by the Laplacian operator.

An embodiment of the inventive concept has observed that both the Laplacian and bi-Laplacian have advantages and disadvantages. Aiming to take the benefits of both operators, an embodiment of the inventive concept may propose to use the combination of two operators, for example, $-a L_s + (1-a) L_s M^{-1} L_s$. The last columns of FIGS. 4 and 5 show the results for $-0.5 L_s + 0.5 L_s M^{-1} L_s$. The combination inherits the interpolating nature of the Laplacian, with guaranteed smoothness across the splines. That is, the combination of two operators shows the most natural results.

From the viewpoint of skinning weight distribution, the Laplacian-based interpolation has another problematic phenomenon. While it is natural that the weight decreases to zero as the vertex gets farther from the lowest iso-value spline, the actual results in FIGS. 4 and 5 show that the weights of the far region still remains similar to the minimum iso-value. A solution to this would be to add another spline with zero iso-value to where the weights should be zero, but this is somewhat cumbersome.

Diffusion Flow Method

Diffusion flow is a mathematically well-understood model for the time-dependent process of smoothing a given signal value. Diffusion flow with the implicit Euler integration of matrix is formulated as $(I - h\Delta) f(t+h) = f(t)$, where h denotes a time period for the smoothing process. As h increases, the signal value $f(t+h)$ may be propagated more smoothly. The computation of the skinning weight by using the diffusion-based method is introduced with the existing famous heat equation: $(H - L) w = H p$, where $L = M^{-1} L_s$ is a discrete approximation of the Laplacian at each vertex. In existing work, the initial values are assigned to the p vector and different time parameters are given to each vertex by using the diagonal matrix H. In an embodiment of the inventive concept, H may be simplified to the identity matrix. By generalizing the Laplacian $L_s$ with $-Q$ and by multiplying the mass matrix M to the equation, the diffusion flow equation may be written as Equation 11 below.

$$(\beta M + Q) w^s = \beta M p \quad \text{[Equation 11]}$$

Herein, β denotes a time parameter for diffusion.

Formulating a quadratic optimization problem to satisfy Equation 11 above with the spline constraint may lead to Equation 12 below.

$$w^s = \underset{x}{\arg\min}\, x^T (\beta M + Q) x - 2 x^T \beta M p \quad \text{s.t.} \quad \text{[Equation 12]}$$

$$A x = s^i$$

Similarly to the interpolation-based method, an embodiment of the inventive concept may treat the constraint as a soft constraint and may obtain the solution as Equation 13 below.

$$(\alpha \beta M + \alpha Q + A^T A) w^s = A^T s^i + \alpha \beta M_p \quad \text{[Equation 13]}$$

Figure 6:
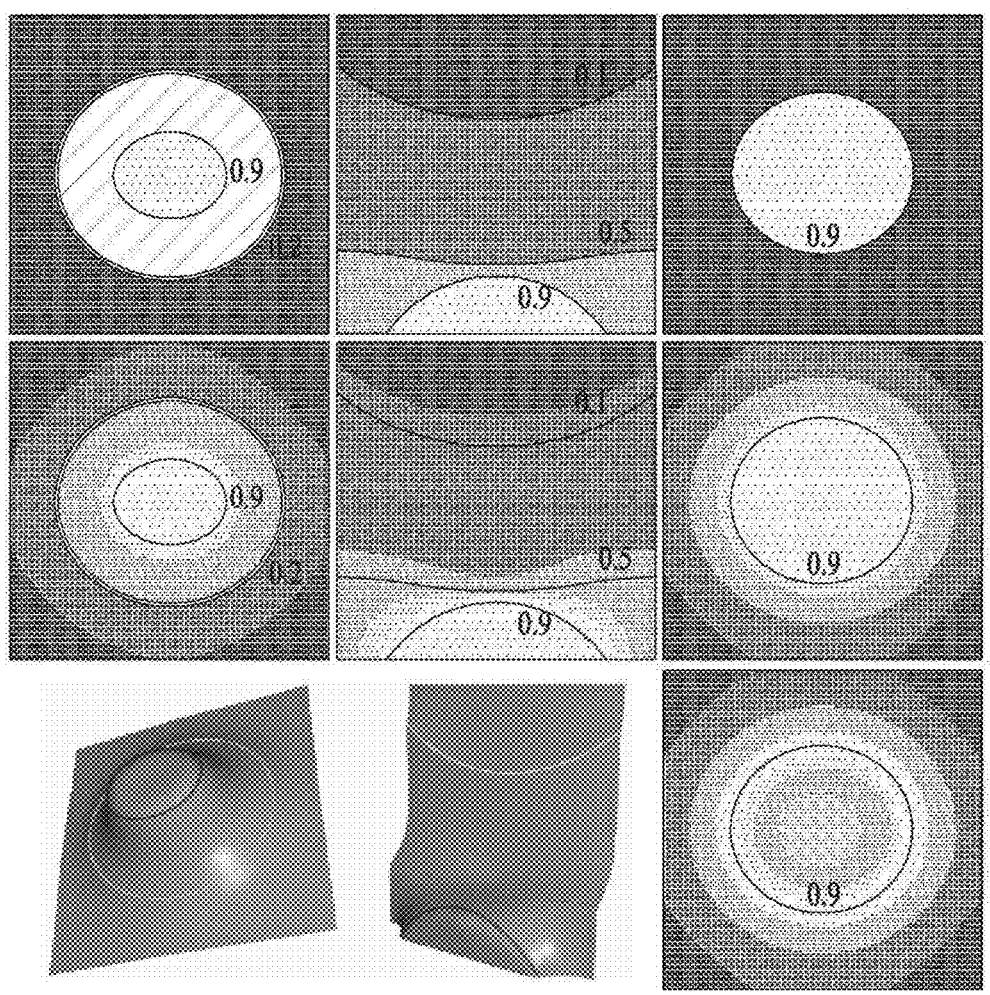
FIG. 6 is a drawing illustrating the results for various spline configurations.

FIG. 6 is a drawing illustrating the results for various spline configurations. The top of FIG. 6 illustrates input splines with iso-values marked and the visualization of the initial value p. The middle of FIG. 6 illustrates the resulting skinning weight generated with the diffusion-based method using the sum of Laplacian and bi-Laplacian. Left two images of the bottom of FIG. 6 show deformation applied on normal direction, and a right image of the bottom of FIG. 6 shows the skinning weight solved without assigning vector p.

An embodiment of the inventive concept may set the initial value of vector p such that $p_j=s_k^i$ when a vertex j is located inside the spline of $s_k^i$, and 0 otherwise. The Q matrix may be set to $-0.5\ L_s+0.5\ L_s M^{-1}\ L_s$ to make it consistent with the interpolation-based method. As may be observed in FIG. 6, the diffusion flow method may smoothly attenuate the skinning weights to the outer region without requiring the 0 valued isoline, which is a desired property as a skinning weight generator. A notable limitation of the diffusion flow method is that, as may be seen on the bottom row of FIG. 6, it does not smoothly interpolate the weights between the two iso-values, which give a staircase-like weight distribution.

The diffusion-based method may be a good choice for the case where the skinning weights may be simply controlled by a single iso-value spline. In such a case, the diffusion-based method may exhibit natural weight attenuation properties while avoiding spline interpolation.

Describing diffusion flow for a single spline, in order to compute Equation 13 above, the vector p must be initialized with proper values as in the top right of FIG. 6. When p is initialized with zero values and solved with one spline, the value on the spline may be propagated from the spline, as shown in the bottom right of FIG. 6. This may not be a desired weight distribution for skinning. In general, when a spline creates a closed region, the user would want the region to share the same weights as the iso-value of the spline and the weights to smoothly propagate to the outside, as shown in the middle right of FIG. 6. For this, the system needs to know the region, and this may be achieved by asking the user to select any vertex in the region. The region could be found by collecting reachable vertices in a flood-filling manner from the selected vertex. An embodiment of the inventive concept may use the interpolation-based method to find the boundary region. Specifically, an embodiment of the inventive concept may solve Equation 8 above with an additional constraint that the selected vertex has a very high weight. This makes weights higher than the iso-value of the vertices inside the region, and an embodiment of the inventive concept may collect these vertices. Subsequently, an embodiment of the inventive concept may assign p with $p_j=s_k^i$ for the vertex j in the region and may solve Equation 13 above. The above identification step may be performed only once when a spline is created. During the following spline editing process, the region may be efficiently updated by collecting vertices with weights higher than $s_k^i$.

Describing another derivation, an embodiment of the inventive concept may derive the equation for the diffusion flow method from the energy minimization viewpoint. In addition to the quadratic energy $x^T Q x$ and the spline constraint $Ax=si$, an embodiment of the inventive concept may encourage the weight to be similar to the original value $x=p$. Putting these together may lead to the energy function of the form as Equation 14 below.

$$E(x)=\alpha x^T Q x+(Ax-s^i)^T U(Ax-s^i)+\alpha\beta(x-p)^T M(x-p) \quad \text{[Equation 14]}$$

The matrix U may determine the importance among the spline constraints and may be set to 1 as in the interpolation-based method. The mass matrix M may be used to scale the importance of each vertex for $x=p$ with the area associated with the vertex. Minimization of Equation 14 above may result in the same equation as Equation 13 above.

Hybrid Method of Interpolation and Diffusion

To combine the advantages of the interpolation-based method and the diffusion-based method, an embodiment of the inventive concept may provide a hybrid method for a mesh with more than one spline. The hybrid method may be to divide the regions for the interpolation-based method and diffusion-based method. Specifically, to take advantage of its capability of interpolating iso-values of the spline constraint, an embodiment of the inventive concept may set an interpolation-based region $V_i(\in \Re^{N_i \times 3})$ as the vertices that will be assigned with weights higher than the smallest iso-value among the splines. Then an embodiment of the inventive concept may set the remaining region as a diffusion-based region $V_d(\in \Re^{N_d \times 3})$ to diffuse the iso-value to the surrounding region. That is, when the minimum iso-value is given, an embodiment of the inventive concept may divide the interpolation-based region and the diffusion-based region based on the minimum iso-value.

Figure 7:
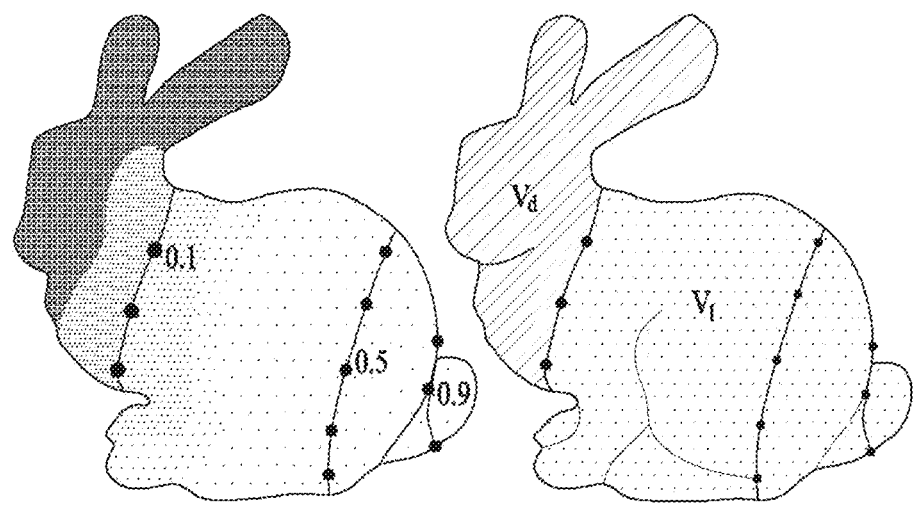
FIG. 7 is a drawing illustrating an example of dividing an interpolation-based region and a diffusion-based region with a given spline constraint.

FIG. 7 is a drawing illustrating an example of dividing an interpolation-based region and a diffusion-based region with a given spline constraint. It may be seen that there are the interpolation-based region $V_1$ and the diffusion-based region $V_d$ divided as shown in the right of FIG. 7 based on the given spline constraint shown in the left of FIG. 7.

When an embodiment of the inventive concept rearranges skinning weight computation of Equation 10 or 13 above as a linear system $Cw^s=d$ and divides $w^s$ into weights $w_i^s(\in \Re^{N_i})$ for the interpolation-based region, for the diffusion-based region weight $w_d^s$, the linear system may be written as Equation 15 below.

$$\begin{pmatrix} C_{ll} & C_{ld} \\ C_{dl} & C_{dd} \end{pmatrix} \begin{pmatrix} w_l^s \\ w_d^s \end{pmatrix} = \begin{pmatrix} d_l \\ d_d \end{pmatrix} \quad \text{[Equation 15]}$$

Herein, $C_{ll}$, $C_{ld}$, $C_{dl}$, and $C_{dd}$ denote corresponding block submatrices of C.

Equation 15 above may be solved sequentially in the following order. An embodiment of the inventive concept may first solve the interpolation region with a diffusion region specified as a boundary condition like Equation 16 below.

$$C_{ll}w_l^s=d_l-C_{ld}\tilde{w}_d^s \quad \text{[Equation 16]}$$

Herein, $\tilde{w}_d^s$ denotes the previous weight of the diffusion region before updating the anchor positions.

The difference between $\tilde{w}_d^s$ and $w_d^s$ is negligible as the weights are continuously updated while a user modifies the anchor position. To solve the interpolation region, an embodiment of the inventive concept may set $C=\alpha Q+A^T A$ and $d=A^T s^{-1}$. Then, an embodiment of the inventive concept may solve the diffusion region with the interpolation region as a boundary condition like Equation 17 below.

$$C_{dd}w_d^s=d_d-C_d w_l^s \quad \text{[Equation 17]}$$

Herein, $C=\alpha\beta M+\alpha Q+A^T A$ and $d=A^T s^i+\alpha\beta Mp$. An embodiment of the inventive concept may set $p=0_{N_v}$ because the diffusion region is only computed in the region outside of the minimum iso-value spline.

When the spline is initialized for the first time, no skinning weight is available for distinguishing the regions. Thus, an embodiment of the inventive concept may use the interpolation-based method of Equation 10 above to identify the regions. The hybrid method may be applied thereafter.

Figure 8A:
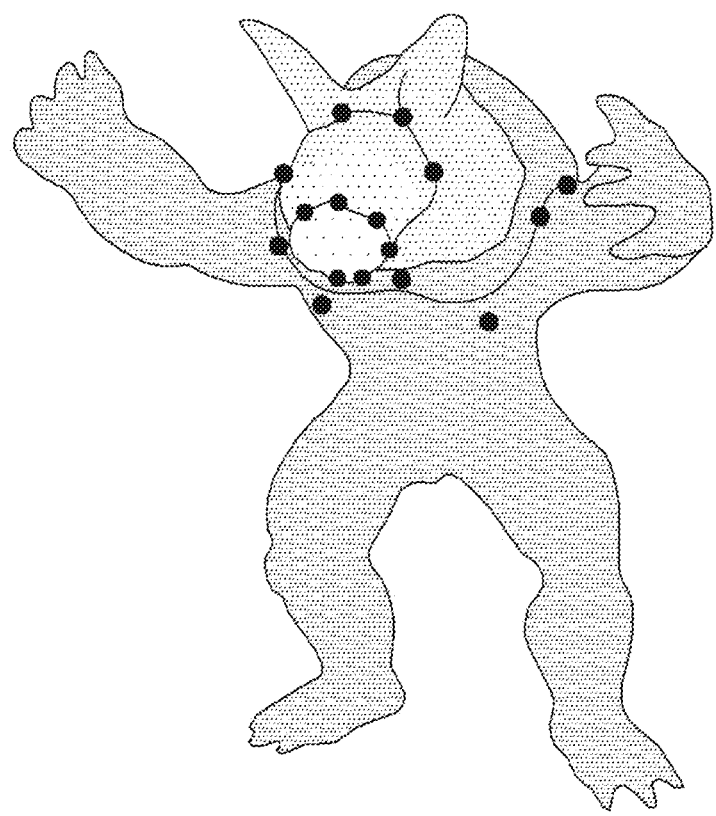
FIGS. 8A, 8B, 8C, and 8D are drawings illustrating an example of the results of an interpolation-based method, a diffusion-based method, and a hybrid method.
Figure 8B:
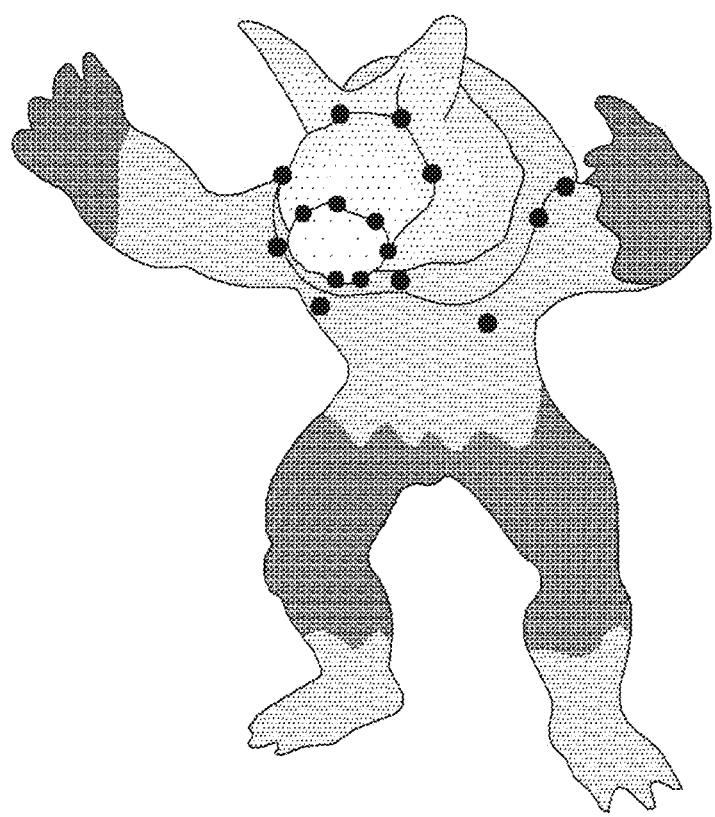
Figure 8C:
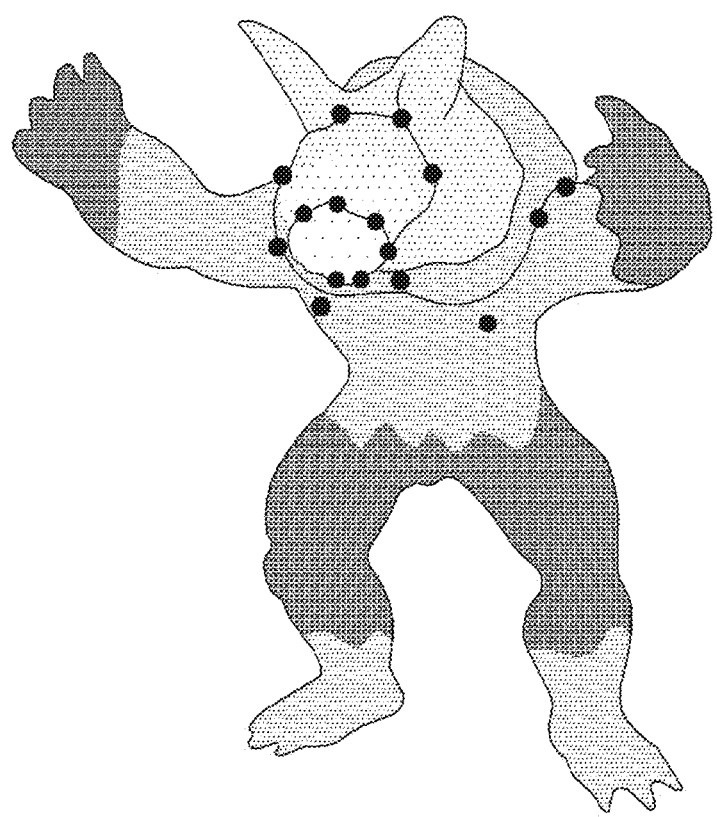
Figure 8D:
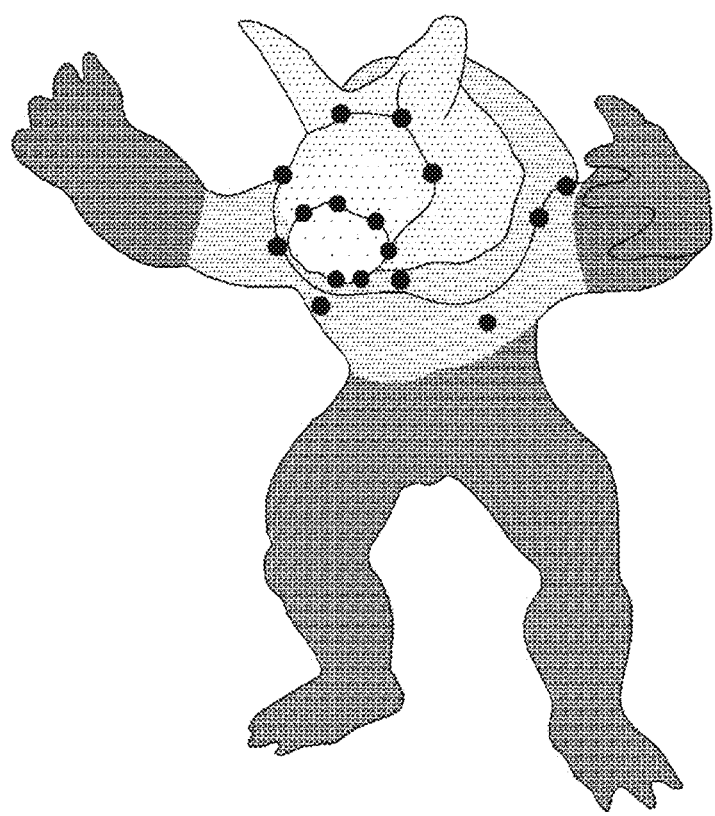

FIGS. 8A to 8D are drawings illustrating an example of the results of an interpolation-based method, a diffusion-based method, and a hybrid method. FIGS. 8A to 8D illustrate the skinning weight generated with iso-values [0.1, 0.5, 0.9]. FIG. 8A illustrates the results by the interpolation-based method. FIG. 8B illustrates the results by the diffusion-based method. FIG. 8C illustrates the results by the hybrid method. FIG. 8D illustrates the results by the hybrid method with local computation. For a clear distinction on the zero-valued weight in FIGS. 8A to 8D, the black color is used only on the vertices of zero weight.

Local Computation

As may be observed from FIG. 8C, even the hybrid method may have unnecessarily large areas with small but non-zero weights. The non-zero weight areas may even spread to the unrelated areas (e.g. foot) because of the effect of the bi-Laplacian term.

Such areas do not exhibit perceivable deformation due to the corresponding controller and thus may be clamped to zero and excluded from weight computation for computational efficiency. To this end, an embodiment of the inventive concept may define a local computing region, as the vertices with the weight values above a threshold (e.g., 0.05), with extra number of rings of neighbor vertices added. The extra neighbor vertices may be added to the local computing region as a user edits the splines. The local computing region may consist of interpolation and diffusion regions. The remaining region may be defined as the zero-clamp region Vz, in which the vertices are forced to have zero weights. That is, an embodiment of the inventive concept may exclude the region, which is assigned the skinning weight of the smallest value, from the computing region and may divide and solve the interpolation-based technique and the diffusion-based technique in the remaining region.

This distinction may allow for local computation to remove the zero-clamp region from solving for the weights. This local computation scheme may contributes greatly to enabling real-time computation, which is essential for the plausible visualization skinning weights while a user manipulates the spline interface.

Introducing the zero-clamp region may turn the system into Equation 18 below.

$$\begin{pmatrix} C_{ll} & C_{ld} & C_{lz} \\ C_{dl} & C_{dd} & C_{dz} \\ C_{zl} & C_{zd} & C_{zz} \end{pmatrix} \begin{pmatrix} w_l^s \\ w_d^s \\ w_z^s \end{pmatrix} = \begin{pmatrix} d_l \\ d_d \\ d_z \end{pmatrix}$$ [Equation 18]

Herein, $w_z^s$ denotes the weights for the zero-clamp region.

Similarly to Equation 15 above, Equation 18 above may be solved with the interpolation region first and may be represented as Equation 19 below.

$$C_{ll} w_l^s = d_l - C_{ld} \tilde{w}_d^s - C_{lz} w_z^s$$ [Equation 19]

The diffusion region may be solved with the interpolation region as the boundary condition and may be represented as Equation 20 below.

$$C_{dd} w_d^s = d_d - C_{dl} \tilde{w}_l^s - C_{dz} w_z^s$$ [Equation 20]

In Equations 19 and 20 above, $w_z^s$ may be set to zero to apply zero weight to the zero-clamp region.

The local computing scheme may require some time to identify the non-zero weight region, but the overall computation time may be significantly reduced. In the initial stage, an embodiment of the inventive concept may solve Equation 10 above and may identify the local computing region. FIG. 8D shows the result of applying the local computation. As such, using the local computation may prevent the non-zero weight value from being unnecessarily distributed, and removing the zero-clamp region from the computing region may contribute to faster computation.

Decomposition into Anchor Weights

In the above-mentioned details, an embodiment of the inventive concept has computed the skinning weight in the iso-value constraints of the spline. Since the spline is determined by a small number of anchor points, an embodiment of the inventive concept may decompose the skinning weight according to the effect of the anchor points, which leads to increased computational efficiency.

The anchor weight in an embodiment of the inventive concept may denote a transform matrix of transforming iso-values assigned to anchor points into the skinning weight.

For the interpolation-based method, from Equation 10 above and $s^i = Bc^i$, an embodiment of the inventive concept may relate $w^s$ and $c^i$ as Equations 21 and 22 below.

$$w^s = Kc^i$$ [Equation 21]

$$(\alpha Q + A^T A) K = A^T B$$ [Equation 22]

Herein, each column of the $K(\in \mathfrak{R}^{N_v \times N_a})$ matrix represents the influence of the anchor point on the skinning weight of every vertex. Thus, the matrix K will be termed anchor weight matrix.

K may remain constant when the anchor point positions do not change. Therefore, when only the iso-value of an anchor is changed, $w^s$ may be computed by multiplying the pre-computed matrix K with the new $c^i$ instead of solving Equation 10 above for the linear system. When an anchor position is manipulated, the anchor weight matrix may be updated by solving Equation 22 above.

It may be shown that Equation 21 above holds for the diffusion method if K is defined to satisfy Equation 23 below.

$$(\alpha \beta M + \alpha Q + A^T A) K = A^T B + \alpha \beta M P$$ [Equation 23]

Herein, $P(\in \mathfrak{R}^{N_v \times N_a})$ denotes a matrix with every column being the p vector.

$p_j = 1/N_a$ for the diffusion flow method with a single spline, and $p = 0_{N_v}$ for the hybrid method with multiple splines.

FIG. 9 is a drawing illustrating an example of an anchor weight and its applied skinning weight on a bunny model. The top of FIG. 9 illustrates the results of the hybrid method of isolines [0.1, 0.5, 0.9], and the bottom of FIG. 9 illustrates the results of the diffusion-based method with only one isoline [0.8]. The anchor weight may be the highest for the vertex closest to the anchor point and may diminish with the distance.

Describing the local computation for the anchor weight, when a user moves the position of an anchor point, only the vertices with a non-zero anchor weight corresponding to the anchor point may be affected. Therefore, an embodiment of the inventive concept may further reduce the above-mentioned local computing region by using the anchor weight.

Figure 10A:
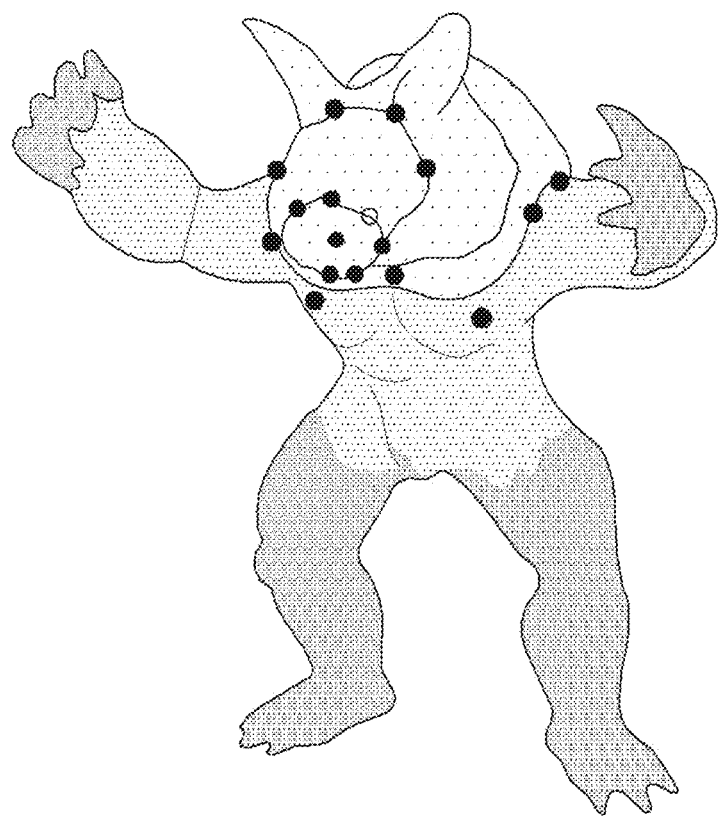
FIGS. 10A, 10B, 10C, and 10D are drawings illustrating the local regions computed by the skinning weight and by the anchor weight, as well as and the resulting skinning weight distributions.
Figure 10B:
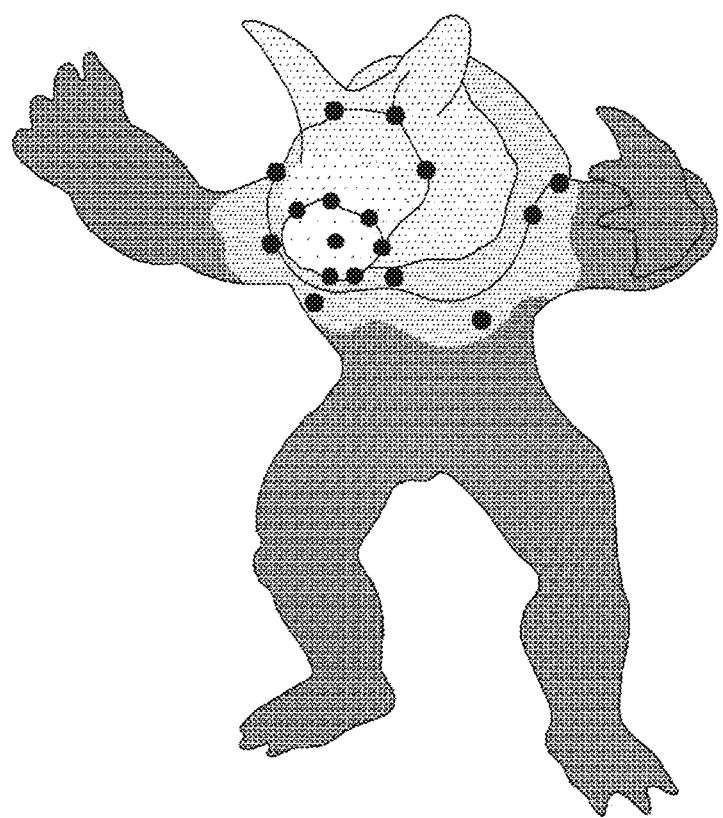
Figure 10C:
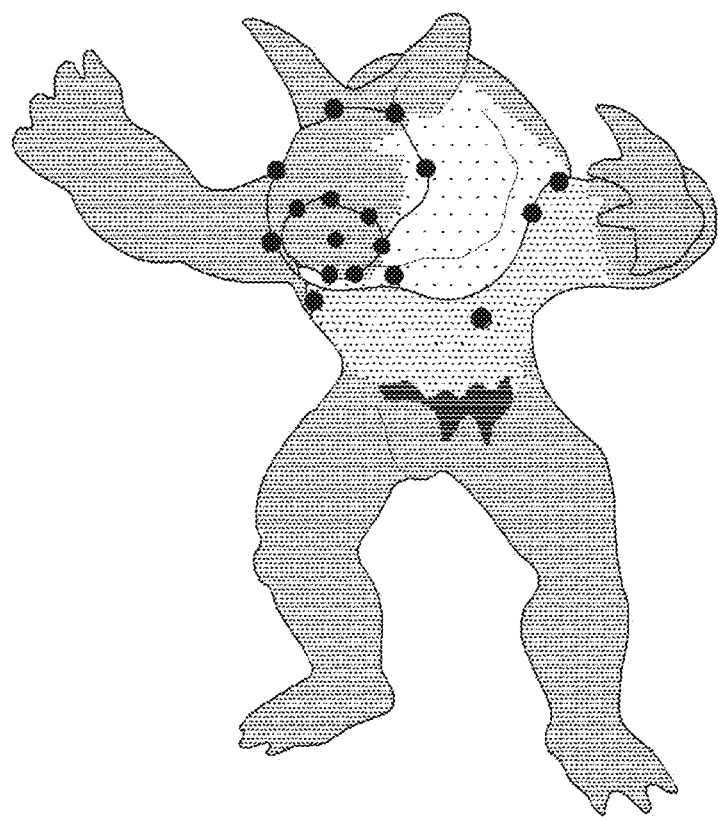
Figure 10D:
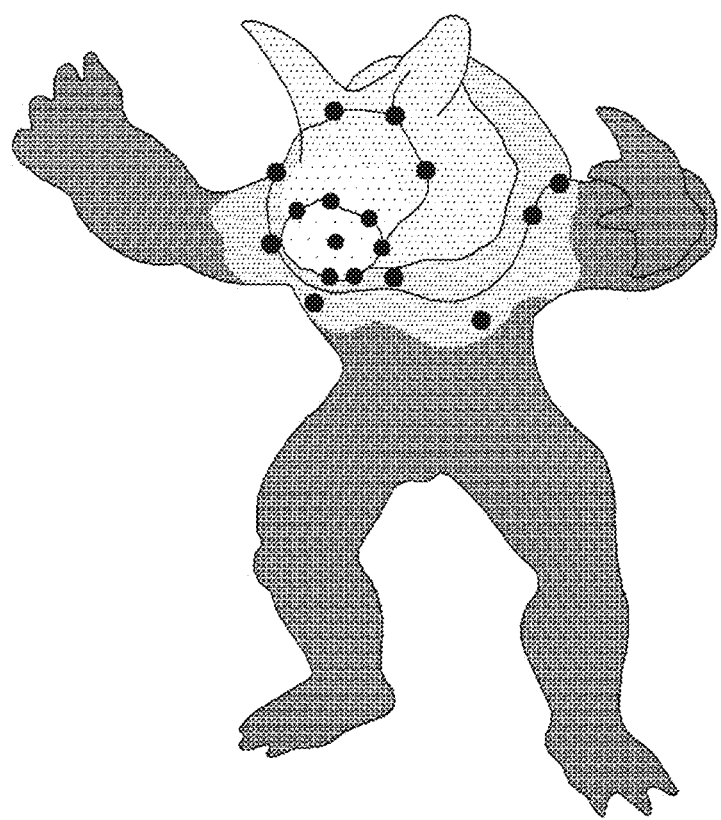

FIGS. 10A to 10D are drawings illustrating an example of the local regions computed by the skinning weight and by the anchor weight, as well as and the resulting skinning weight distributions. FIG. 10A illustrates the local computation region identified with the skinning weight divided into the interpolation region (head region), the diffusion region (arm and chest regions), and the zero-clamp region (hand and leg regions). FIG. 10B illustrates the skinning weight of FIG. 10A. FIG. 10C illustrates the local computation region identified with the anchor weight divided into each region with the boundary region added. FIG. 10D illustrates the skinning weight of FIG. 10C.

As may be observed from FIGS. 10A to 10D, despite a much reduced local computing region that enables a shorter computing time, the method using anchor weights may produce similar results to the method using the skinning weights.

Gradient Control

The above-mentioned methods may allow for solving skinning weights that smoothly interpolate the spline constraints. In these methods, the interpolation characteristics may be determined by the operators and their modification may not be possible. However, fine control of the weight distribution may often be necessary. For example, with two given splines, a user may want the weights to change only slightly near the splines but change sharply in the middle of the splines. This could be achieved by placing additional splines of new iso-values between the two splines, but this may increase the number of user parameters considerably and may be inconvenient. An embodiment of the inventive concept would be to allow users to control the slope of the weight distribution on the spline, which is similar to the tangent editing function of spline curve editing, facilitating fine control. To this end, an embodiment of the inventive concept may employ a method to control the difference between the computed skinning weight and the iso-value of the anchors. The method may be achieved by the following Equation 24 below.

$$w^g = Gc^g$$

$$G = K \circ D,$$

$$D = 1_{N_v} c^{iT} - W^s \quad \text{[Equation 24]}$$

Herein, $G(\in \Re^{N_v \times N_a})$ denotes a matrix where each column is a gradient weight vector for each anchor point, hence termed gradient anchor weight matrix, and $c^g$ denotes the coefficient vector that manipulates the slope for each anchor.

When $c_k^g > 0$, the slope around the k-th anchor may become flatter, and when $c_k^g < 0$, the slope may get steeper. The matrix $D(\in \Re^{N_v \times N_s})$ may encode the difference between the iso-value of the anchor and the skinning weight in each column, where $1_{N_v}$ is a vector filled with 1, and $W^s(\in \Re^{N_v \times N_s})$ denotes a matrix that juxtaposes the Na copy of the weight vector. The operator $\circ$ may perform component-wise multiplication. For a matrix K, an embodiment of the inventive concept may use Equation 21 above for the anchor weight, with slight modification that clamps negative and small positive values to zero. The final skinning weight may be computed by adding a gradient skinning weight on the original skinning weight and may be represented as Equation 25 below.

$$w = w^s + w^g \quad \text{[Equation 25]}$$

Figure 11:
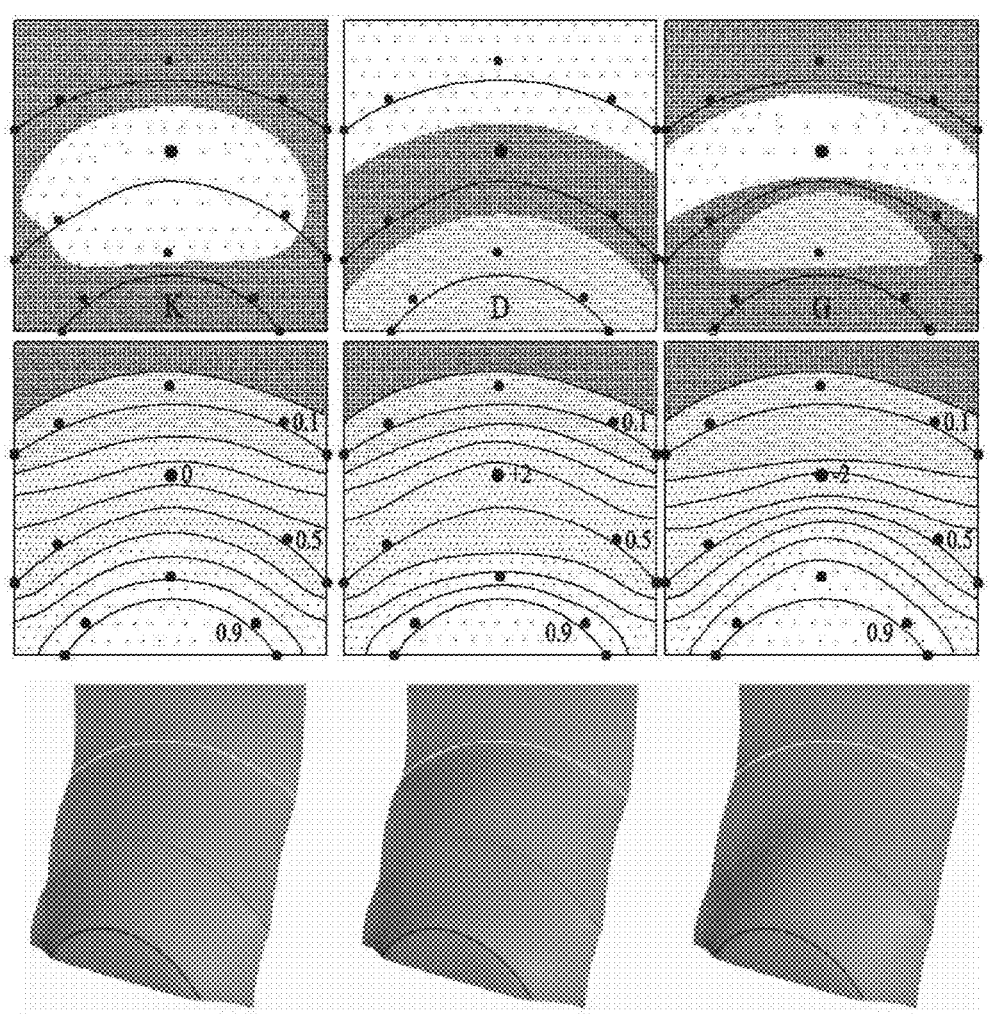
FIG. 11 is a drawing illustrating an example of visualizing the value of each matrix K, D, G, as well as the effect of gradient control on the skinning weight.

FIG. 11 is a drawing illustrating an example of visualizing the value of each matrix K, D, G, as well as the effect of gradient control on the skinning weight.

The top of FIG. 11 illustrates, from the left, the anchor weight matrix K, the difference matrix D, and the gradient weight matrix G for a selected anchor. For the difference and gradient weight matrices, negative values are visualized with the blue color(hatching near 0.1 value). For the gradient matrix, values are scaled 10 times for clear visualization. The middle of FIG. 11 illustrates different skinning weights obtained using the gradient coefficient set to 0 (left), 2 (middle), or −2 (right) for the anchor. Additional isolines are visualized to emphasize the change. The bottom of FIG. 11 illustrates corresponding deformation applied on the normal direction.

Spline Editing and Fitting

A user may dynamically build splines from scratch by picking anchor positions on the mesh through a GUI. Splines may also be built by extracting isolines from the given skinning weight. Once built, an embodiment of the inventive concept may provide anchor editing operations, such as repositioning, deletion, insertion, splitting, and merging. During the editing process, an embodiment of the inventive concept may perform local computations for real-time user interactions.

Spline Fitting from Given Weight

Figure 12:
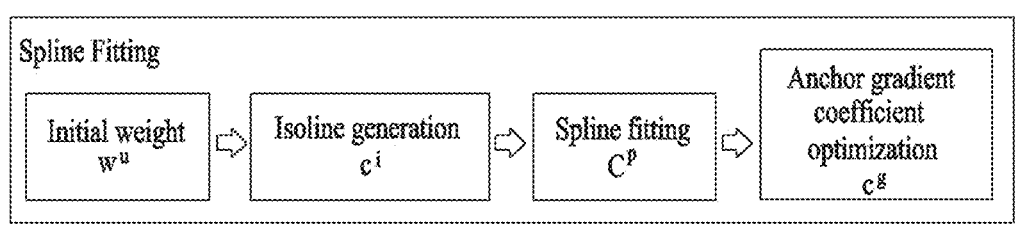
FIG. 12 is a drawing illustrating an overall overview of spline fitting.

When skinning weights are specified on the mesh surface, generated by a paintbrush interface, an automatic skinning algorithm, or a spline interface, an embodiment of the inventive concept may extract an isoline for a selected iso-value, and then fit a spline to the isoline. Finally anchor coefficient optimization may be performed to minimize the difference between user given weights. A user may manipulate this newly generated spline to modify the existing skinning weight. The overview of spline fitting is illustrated in FIG. 12.

Describing isoline generation, an embodiment of the inventive concept may represent an isoline as a sequence of points on the edge of a mesh, i.e., $O^p = \{o_0, o_1, \ldots, o_{N_o-1}\}$. Let $o^i$ denote a vector of iso-values for isolines. The position of isoline points may be identified by linear interpolation between the vertices of each edge $o_k^p = l_{k0} x_{k0} + (1 - l_{k0}) x_{k1}$, with the interpolation weight $1_{kj}$ satisfying $o_k^i = l_{k0} w(x_{k0}) + (1 - l_{k0}) w(x_{k1})$. An embodiment of the inventive concept may search through every edge to find isoline points and sort them by the adjacency.

The spline fitting method should ideally be able to determine the optimal number of anchor points and their positions, but it may require heavy computation for real-time applications. Since real-time interactivity is critical, an embodiment of the inventive concept r ray set the number of anchor points Na to be proportional to the number of isoline points No and the magnitude of curvature $o^{cm}$ of the isoline. Herein, the magnitude of the curvature $o^{cm}$ of the isoline may be represented as Equation 26 below.

$$o^{cm} = \sum_{k=1}^{N_o-1} \left( \frac{o_k^p - o_{k-1}^p}{\|o_k^p - o_{k-1}^p\|} \cdot \frac{o_k^p - o_{k+1}^p}{\|o_k^p - o_{k+1}^p\|} + 1 \right) \quad \text{[Equation 26]}$$

An embodiment of the inventive concept may set the optimal number of anchor point as $$N_a = \left[ \frac{N_o}{15} \right] + [o^{cm}] + 3.$$

The optimal number of these anchor points may be set based on experiments and results.

To compute anchor point positions, an embodiment of the inventive concept may aim for the spline points to coincide with the isoline points, that is, $S^p \approx O^p$. Let $u^o = u_0^o$, $u_1^o, \ldots, u_{N_0-1}^o$ (No=Ns) denote the parameter values for spline points $S^p$. An embodiment of the inventive concept may set the spline parameter value $u_k^o$ for $s_k^p$ to its are length divided by the total length of isoline. Herein, the spline parameter value $u_k^o$ for $s_k^p$ may be represented as Equation 27 below.

$$u_k^o = \frac{\sum_{t=0}^{k-1} \|o_{t+1}^p - o_t^p\|}{\sum_{t=0}^{N_o-1} \|o_{t+1}^p - o_t^p\|}$$  [Equation 27]

Then an embodiment of the inventive concept may build the basis function $B(u^o)$ based on the parameter value $u^o$. When an embodiment of the inventive concept simplifies the relation between the spline points and the anchor points to be linear, like a regular spline in Euclidean space, isoline points may be represented with linear equation: $O^p = B(u^o) C^p$.

An embodiment of the inventive concept may compute anchor points as $C^p = B^+(u^o)O^p$, where $B^+$ is a pseudo inverse of the basis matrix. However, this does not guarantee that the anchor points are on the surface. An embodiment of the inventive concept may regard $C^p$ as the weighted ($B^+$) average of $O^p$, and the embodiment of the inventive concept may use Equation 3 above with $B^+$ as the weights and $O^p$ as the anchor points to compute $C^p$. For an isoline with an open loop, an embodiment of the inventive concept may constrain the first and last anchor points to coincide with isoline points at both ends. Finally, an embodiment of the inventive concept may use the Thong projection as a post-process to project the anchor points on the surface. This approximation does not guarantee that the fitted spline matches the target isoline exactly, but it may give a satisfying performance in terms of computation time and accuracy.

Figure 13:
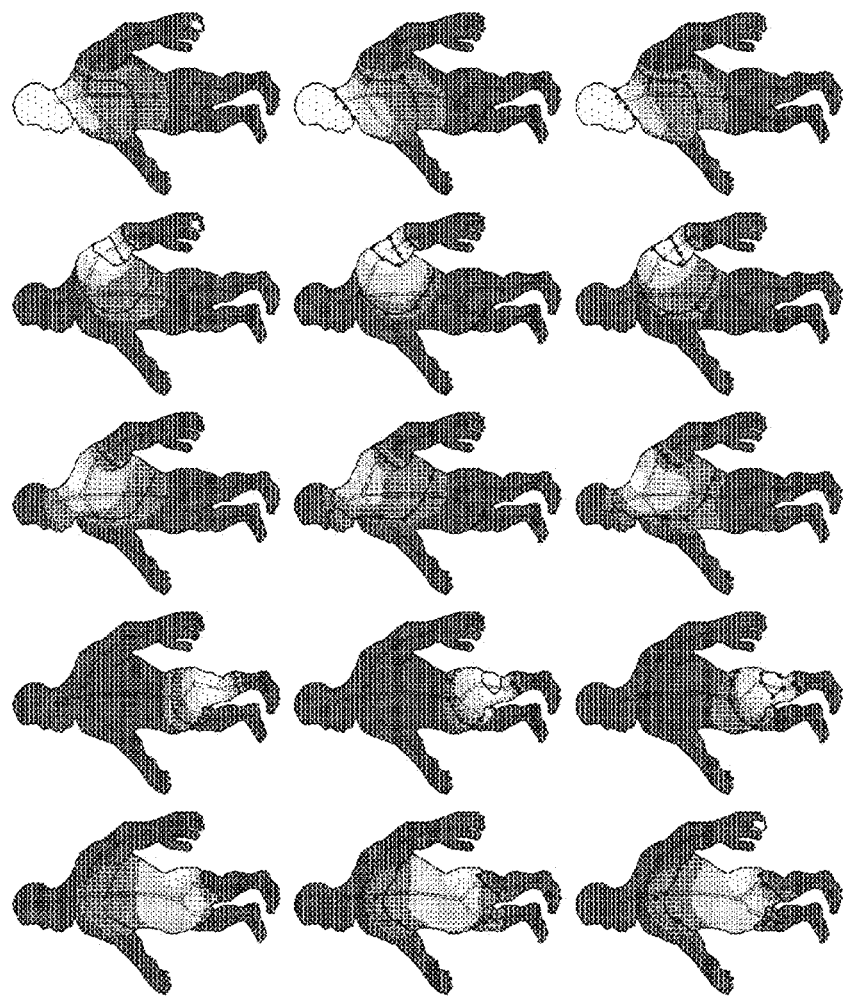
FIG. 13 is a drawing illustrating an example of the results of the spline fitted to the isoline of the automatically generated skinning weight.

FIG. 13 is a drawing illustrating an example of the results of the spline fitted to the isoline of the automatically generated skinning weight. FIG. 13 illustrates the ogre model.

The top of FIG. 13 illustrates automatically generated skinning weight using BBW and extracted isolines of iso-values [0.1, 0.9]. The middle of FIG. 13 illustrates the spline fitted to the isoline and the computed skinning weight. The bottom of FIG. 13 illustrates the skinning weight after gradient coefficient optimization.

Anchor Gradient Coefficient Optimization

Since spline fitting is performed only on isolines, the weight distribution made by the fitted spline may not exactly be the same as the input skinning weights $w^u$, which may have been obtained by manual painting or by automatic skinning algorithms. In particular, the in-between region where the spline is not specified may show different skinning weight results. To reduce the discrepancy, an embodiment of the inventive concept may perform anchor gradient coefficient optimization. An embodiment of the inventive concept may have introduced the gradient control, which adds a gradient skinning weight on the top of the skinning weight. An embodiment of the inventive concept may find the optimal gradient anchor coefficient cg to minimize the difference. The optimal gradient anchor coefficient cg may be calculated as Equation 28 below.

$$c^g = G^+(w^u - w^s)$$  [Equation 28]

Herein, $G^+$ denotes the pseudo inverse of the gradient anchor weight matrix G in Equation 24 above.

As may be observed from the fitting results when only the spline fitting shown in FIG. 13 is applied and when the gradient optimization is additionally performed, the gradient optimization may significantly reduce the gap of the computed weight from the input weight.

Anchor Editing

A user may modify the configuration of the spline by editing the anchors. An embodiment of the inventive concept may provide a set of tools that may intuitively edit the anchors.

(1) Anchor Positioning may allow the user to change the position of the anchor point. As the anchors are repositioned, the skinning weights may be recomputed.

(2) Anchor Deletion may reduce the number of anchors. An embodiment of the inventive concept may delete the entire closed-loop spline when the number of anchors becomes less than 4.

(3) Anchor Insertion may add a new anchor point to the user selected position. The gradient coefficient for the anchor may be set to the average of the two adjacent anchors.

(4) Anchor Splitting may divide an open-loop spline into two or may change the topology of a closed-loop spline into an open loop.

(5) Anchor Merging may combine two anchor points into one. Using this operation, two open-loop splines may be merged into one, or an open-loop spline may be changed to a close-loop spline. The anchor gradient coefficient may be set to the average of the two merged anchors.

Weight Freezing

An embodiment of the inventive concept has focused on the skinning weights for one bone. Since the total sum of weights over the bones must be one for every vertex, the weight modification for a bone necessitates the adjustment of the weights for other bones, typically through the normalization. This may lead to an undesirable consequence where previously edited weights get changed. This problem is also somewhat unavoidable for any skinning weight methods, including the paint interface. To alleviate this problem, an embodiment of the inventive concept may employ the concept of weight freezing. When a user is satisfied with the skinning weights of a specific bone and does not want it to be modified, he or she may simply fix the skinning weights for the bone. Normalization may then change the values of only the unfixed skinning weights.

Figure 14:
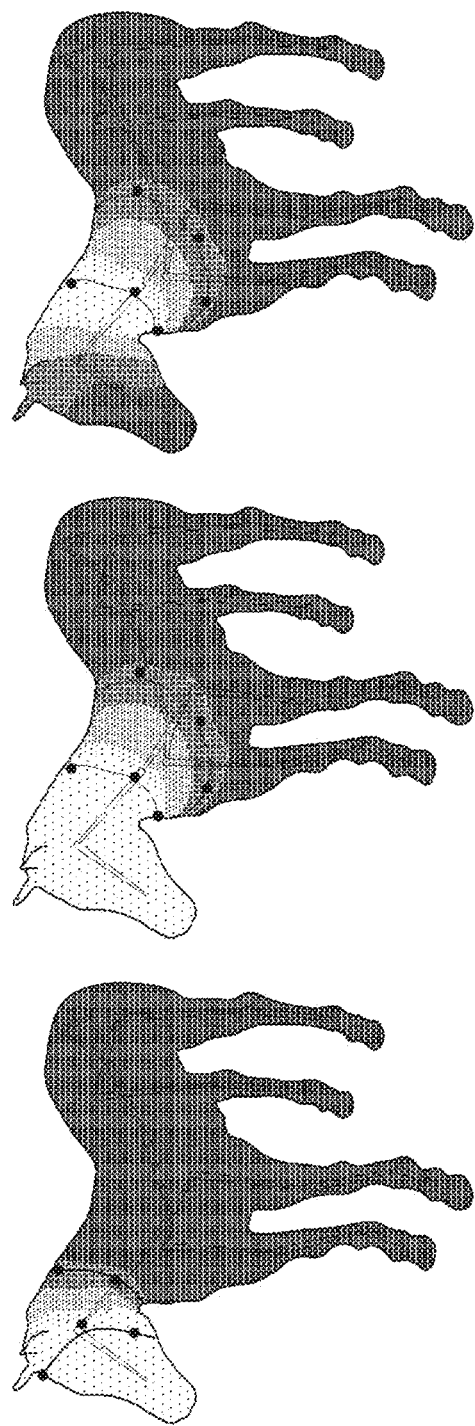
FIG. 14 is a drawing illustrating an example of a skinning weight according to whether weight freezing is applied.

Weight freezing may also be beneficial when defining the skinning weight because the previously fixed weight serves as a constraint. For example, the left of FIG. 14 illustrates the skinning weight for the head bone, defined by two splines of iso-values [0.05, 0.9] with weight freezing. The middle of FIG. 14 illustrates the skinning weight for the neck bone, defined with two splines of iso-values [0.05, 0.9] without using weight freezing. The right of FIG. 14 illustrates the resulting weight for the neck after subtracting the fixed weight due to the head bone. Of course. It is apparent to those skilled in the art that the weight freezing may be applied to the joints connecting two bones and may also be applied to joints with more bones.

As such, the method according to an embodiment of the inventive concept may use a spline-based interface of a 3D model surface to edit a skinning weight, reducing a time taken to perform 3D model rigging and enhancing the quality of the 3D model rigging.

Furthermore, the method according to an embodiment of the inventive concept may provide a spline-based interface in editing a skinning weight which is essential for rigging to more intuitively employ the spline-based interface than a paint-based interface provided by conventional rigging related software.

Such a method according to an embodiment of the inventive concept may be configured with a device. For example, the device according to an embodiment of the inventive concept may include an acquisition unit for obtaining an isoline on a 3D model and a computation unit for computing a skinning weight of the 3D model based on the obtained isoline.

The computation unit may calculate the skinning weight of the 3D model based on the obtained isoline and a hybrid method in which an interpolation-based method and a diffusion-based method are combined.

The computation unit may calculate the skinning weight of the 3D model by minimizing energy which satisfies a predetermined constraint.

When a skinning weight is specified on a mesh surface of the 3D model, the acquisition unit may obtain an isoline for an iso-value of the specified skinning weight.

In addition, a device according to another embodiment of the inventive concept may include a generation unit for generating a spline on a 3D model and a computation unit for computing a skinning weight of the 3D model based on the generated spline.

When a skinning weight is specified on a mesh surface of the 3D model, the generation unit may obtain an isoline for an iso-value of the specified skinning weight and may generate the spline using the obtained isoline.

The computation unit may compute the skinning weight of the 3D model by minimizing energy which satisfies a predetermined spline constraint.

When there is only one iso-value spline on the 3D model, the computation unit may calculate the skinning weight based on a diffusion-based method. When there is more than one iso-value spline on the 3D model, the computation unit may compute the skinning weight based on a hybrid method in which an interpolation-based method and the diffusion-based method are combined.

The computation unit may divide a surface region of the 3D model into an interpolation-based region and a diffusion-based region based on a minimum iso-value of the generated spline and may compute the skinning weight for the divided interpolation-based region and the skinning weight for the divided diffusion-based region by respectively using the interpolation-based method and the diffusion-based method.

The computation unit may set a region above a predetermined threshold to a local computation region by using the predetermined threshold and may compute the skinning weight for the set local computation region.

The computation unit may compute the skinning weight of the 3D model by controlling a slope of skinning weight distribution on the generated spline.

The computation unit may compute the skinning weight of the 3D model based on an anchor weight for transforming iso-values arranged to anchor points of the generated spline into a skinning weight.

Of course, it is apparent to those skilled in the art that the device according to embodiments of the inventive concept may include all details described with reference to FIGS. 1 to 14.

The foregoing systems or devices may be realized by hardware components, software components, and/or combinations thereof. For example, the systems, devices, and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit matt access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to embodiments may be implemented with program instructions which may be executed through various computer means and may be recorded in computer-readable media. The media may also include, alone or in combination with the program instructions, data files, data structures, and the like. The program instructions recorded in the media may be designed and configured specially for an embodiments or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of embodiments, or vice versa.

According to embodiments of the inventive concept, the apparatus may use a spline-based interface of a 3D model surface to edit the skinning weight.

According to embodiments of the inventive concept, the apparatus may provide a spline-based interface, reducing a time taken to perform 3D model rigging and enhancing quality.

According to embodiments of the inventive concept, the apparatus may provide a spline-based interface in editing the skinning weight which is essential for rigging to more intuitively use the spline-based interface than a paint-based interface provided by the conventional rigging related software, for example, Maya, Blender, or the like.

With the development of technologies, such as VR and AR, which are currently growing at a fast speed as well as movies, animations, and game industries, the natural deformation control of virtual characters has been needed to be gradually core technology. In other words, according to embodiments of the inventive concept, the apparatus may be applied to various industries which needs virtual characters, and, particularly, should be able to be applied to fields, such as, a game, VR, and AR, which are essential to deform characters in real time.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A method for interfacing a skinning weight of a three-dimensional (3D) model, the method comprising:
   obtaining an isoline on the 3D model;
   generating a spline on the 3D model by using the obtained isoline; and
   computing a skinning weight of the 3D model based on the generated spline.

2. The method of claim 1, wherein the computing of the skinning weight comprises:
   computing the skinning weight of the 3D model based on the obtained isoline and a hybrid method in which an interpolation-based method and a diffusion-based method are combined.

3. The method of claim 1, wherein the computing of the skinning weight comprises:
   computing the skinning weight of the 3D model by minimizing energy which satisfies a predetermined constraint.

4. The method of claim 1, wherein the obtaining of the isoline comprises:
   when a skinning weight is specified on a mesh surface of the 3D model, obtaining an isoline for an iso-value of the specified skinning weight.

5. A method for interfacing a skinning weight of a 3D model, the method comprising:
   generating a spline on the 3D model based on a user input using a spline-based interface; and
   computing a skinning weight of the 3D model based on the generated spline.

6. The method of claim 5, wherein the generating of the spline comprises:
   when a skinning weight is specified on a mesh surface of the 3D model, obtaining an isoline for an iso-value of the specified skinning weight; and
   generating the spline by using the obtained isoline.

7. The method of claim 5, wherein the computing of the skinning weight comprises:
   computing the skinning weight of the 3D model by minimizing energy which satisfies a predetermined constraint.

8. The method of claim 5, wherein the computing of the skinning weight comprises:
   when there is only one iso-value spline on the 3D model, computing the skinning weight based on a diffusion-based method; and
   when there is more than one iso-value spline on the 3D model, computing the skinning weight based on a hybrid method in which an interpolation-based method and the diffusion-based method are combined.

9. The method of claim 5, wherein the computing of the skinning weight comprises:
   dividing a surface region of the 3D model into an interpolation-based region and a diffusion-based region based on a minimum iso-value of the generated spline; and
   computing the skinning weight for the divided interpolation-based region and the skinning weight for the divided diffusion-based region by respectively using an interpolation-based method and a diffusion-based method.

10. The method of claim 5, wherein the computing of the skinning weight comprises:
    setting a region above a predetermined threshold to a local computation region by using the predetermined threshold; and
    computing the skinning weight for the set local computation region.

11. The method of claim 5, wherein the computing of the skinning weight comprises:
    computing the skinning weight of the 3D model by controlling a slope of skinning weight distribution on the generated spline.

12. The method of claim 5, wherein the computing of the skinning weight comprises:
    computing the skinning weight of the 3D model based on an anchor weight for transforming iso-values arranged to anchor points of the generated spline into a skinning weight.

13. An apparatus for interfacing a skinning weight of a 3D model, the apparatus comprising a processor configured to:
    generate a spline on the 3D model based on a user input using a spline-based interface; and
    compute a skinning weight of the 3D model based on the generated spline.

14. The apparatus of claim 13, wherein the processor is configured to:
    when a skinning weight is specified on a mesh surface of the 3D model, obtain an isoline for an iso-value of the specified skinning weight; and
    generate the spline by using the obtained isoline.

15. The apparatus of claim 13, wherein the processor is configured to:
    compute the skinning weight of the 3D model by minimizing energy which satisfies a predetermined constraint.

16. The apparatus of claim 13, wherein the processor is configured to:
    when there is only one iso-value spline on the 3D model, compute the skinning weight based on a diffusion-based method; and
    when there is more than one iso-value spline on the 3D model, compute the skinning weight based on a hybrid method in which an interpolation-based method and the diffusion-based method are combined.

17. The apparatus of claim 13, wherein the computation unit processor is configured to:
    divide a surface region of the 3D model into an interpolation-based region and a diffusion-based region based on a minimum iso-value of the generated spline; and
    compute the skinning weight for the divided interpolation-based region and the skinning weight for the divided diffusion-based region by respectively using an interpolation-based method and a diffusion-based method.

18. The apparatus of claim 13, wherein the processor is configured to:
set a region above a predetermined threshold to a local computation region by using the predetermined threshold; and
compute the skinning weight for the set local computation region.

19. The apparatus of claim 13, wherein the processor is configured to:
compute the skinning weight of the 3D model by controlling a slope of skinning weight distribution on the generated spline.

20. The apparatus of claim 13, wherein the processor is configured to:
compute the skinning weight of the 3D model based on an anchor weight for transforming iso-values arranged to anchor points of the generated spline into a skinning weight.

\* \* \* \* \*